Aug. 4, 1936. J. P. TARBOX 2,050,026
SINUOUS SEAM WELD AND PROCESS OF MAKING SAME
Filed Aug. 28, 1933

INVENTOR.
John P. Tarbox

UNITED STATES PATENT OFFICE 2,050,026

SINUOUS SEAM WELD AND PROCESS OF MAKING SAME

John P. Tarbox, Philadelphia, Pa., assignor to Edward G. Budd Manufacturing Company, Philadelphia, Pa., a corporation of Pennsylvania Application August 28, 1933, Serial No. 687,041

4 Claims. (Cl. 219—10)

In the making of seam welds in sheet or plate material by the electrical resistance method the heat of the weld is extended progressively along the line of the weld entirely through both thicknesses of the lap joint and stock and is progressively so sustained as the weld is progressed for various lengths of time and various ranges of temperature which may or may not damage the physical characteristics of the original stock. This is especially true of the welding of stainless steels in which the heat of the weld is permitted to dwell unduly in deleterious ranges and very markedly changes the physical characteristics of the original stock. For example, in the nickel chromium steels in which the steels are rendered corrosive resistant due to the chromium element, heat in the range of 900° to 1500° F. will precipitate the chromium to the grain boundaries as a carbide rendering the material more or less subject to corrosion. For example further, when this material is cold worked to multiply its tensile strength, an undue dwell of heat at annealing temperatures anneals this stock and reduces its tensile strength. Susceptibility to fatigue is also increased. The result is that in the making of the ordinary joint as an electrical resistance welded seam and in which the length of the seam is equal to the length of the joint, the joint has its strength reduced in direct proportion to the impairment of the physical characteristics of the material.

The object of my invention is to overcome this defect in seam welding as ordinarily practiced. Its overcoming is quite simple when understood. The invention consists in making the length of the seam longer than the co-extensive length of the lapped joint. This is simply achieved by zigzagging the seam back and forth transversely of the length of the joint whereby the zigzags or sinuosities of the seam so increase the cross section of metal of impaired characteristics as to bring the strength of the joint up to what it would be if the strength was unimpaired.

Figure 1:
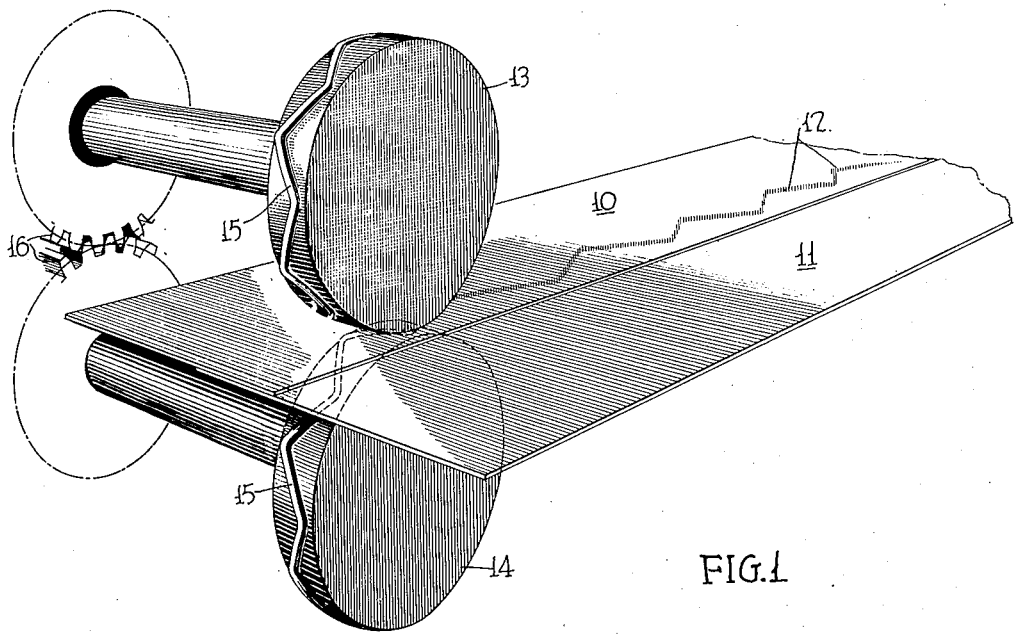
Fig. 1 is a perspective diagrammatic showing of a lap joint seam effected by roller welding showing the roller apparatus through which the weld is perfected.
Figure 2:
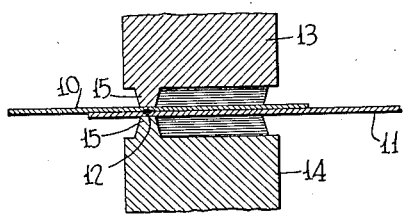
Fig. 2 is a partial axial section of the rollers.

The invention is illustrated in the accompanying diagrammatic drawing of Fig. 1 which depicts a joint composed of two sheets 10 and 11 the margins of which are in lapped relation to each other and are joined together by a seam weld made by the electrical resistance method and designated 12. Fig. 2 also illustrates the wheels 13 and 14 of the roller electrodes utilized in making this weld. The rollers are provided with engaging edges 15 projecting from the main bodies thereof and of zigzag or sinuous form annularly of the rollers 13 and 14. These edges as the rollers progress give the seam 12 a corresponding sinuous form. The rollers are geared together by a gearing 16 of appropriate insulating character whereby the sinuosities of their edges 15 engage the work in synchronism, that is to say, these edges are always in juxtaposition on opposite sides of the work.

Another way of effecting this weld would be by relatively shifting the work with respect to roller type electrodes of standard form or vice versa. Still another way would be to effect the seam weld by reciprocating spot welding electrodes in a manner well known, shifting the work or the electrodes to achieve the zigzag seam 12.

While there is now a well known method of electrical resistance welding which will minimize or prevent the aforementioned impairments of physical characteristics of cold worked stainless steel, it is recognized as a fact that even under the best of conditions, that portion of the weld in which the metal has been melted is in a partly or wholly annealed condition. Its strength has been reduced towards or to the annealed strength of the material. Likewise in some cases, particularly in the thicker sheets and plates there has been a measurable degree of annealing of the metal surrounding that which has been melted to achieve the weld, all depending upon the degree of dwell permitted in deleterious temperatures.

Irrespective of the degree to which any of these impairments may occur, and while some of them are avoidable, the impairment of the metal in the so-called nugget portion of the weld, that which has been melted in the process of welding, would appear to be greatest. The electrical resistance seam welding of my invention will be utilized to raise the strength of the seam per se up to the value which it would have had if this impairment had not taken place. One has only to increase the length of the seam in proportion to the decrease in strength incident to the impairment. In so functioning, the joint of my invention behaves very much as does the scarf joint commonly found in the art of wood joining where the ends of the pieces to be joined together are kerfed, and the kerfs intermeshed and glued together. Such a joint attains the strength of the original wood and even exceeds it while a more nearly lapped or bad joint may be much weaker than the wood. An additional advantage is attained in the increase of the transverse stiffness of the seam against transverse bending of the plates. This is due to the transverse extent of the seaming. Spreading of the plates under pressure is resisted by the zig-zag seam in much the same manner as it is resisted by a double row of rivets or a double row of spot welds.

I desire to cover in the annexed claims each and all of the modifications of which my invention is susceptible as well as all embodiments of it which fall within its generic spirit.

What I claim is:

1. An electric resistance seam-welded plain lapped joint, the welded portion of the material of which, after welding, has as a result of the weld a tensile strength per square inch less than that of those portions of the material not subject to the weld, which joint comprises a single joining seam of continuous aggregate length having an aggregate tensile strength at least substantially equal to the aggregate tensile strength of the main body of the material when the seam and the material not subject to the weld are simultaneously tensed freely extending in the same direction generally transversely of the seam, and which continuous seam has zig-zag form independent of the edges of the joined material.

2. In the art of lap welding sheet metal, the method which consists in applying localized welding heat along the overlapped margins of the sheets to be welded in a substantially zig-zag or sinusoidal path to thereby increase the aggregate length of the welding seam with respect to the length of the said margins and compensate for any decrease in strength in the sheets adjacent the seam due to welding heat.

3. In the art of electric resistance lap welding of sheet metal, the method which consists in tracking welding electrodes along the overlapped margins of the sheets to be welded in a substantially zigzag or sinusoidal path to thereby increase the aggregate length of the welding seam with respect to said margins and compensate for any descrease in strength in the metal adjacent said path due to localized welding heat.

4. Sheet material embodying an electric resistance seam welded plain lap joint characterized in that the joining seam has a substantially zigzag or sinuous form independently of the edges of the joined sheets.

JOHN P. TARBOX.